Nov. 8, 1966 R. P. KULISEK 3,284,045

PLUG VALVE

Filed April 13, 1965 6 Sheets-Sheet 1

INVENTOR.
ROBERT P. KULISEK
BY
HIS ATTORNEY

INVENTOR.
ROBERT P. KULISEK
BY William D. Carothers
HIS ATTORNEY

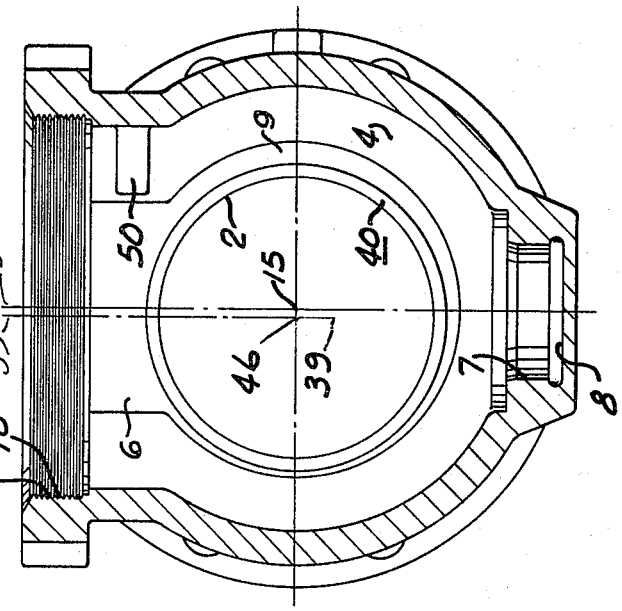
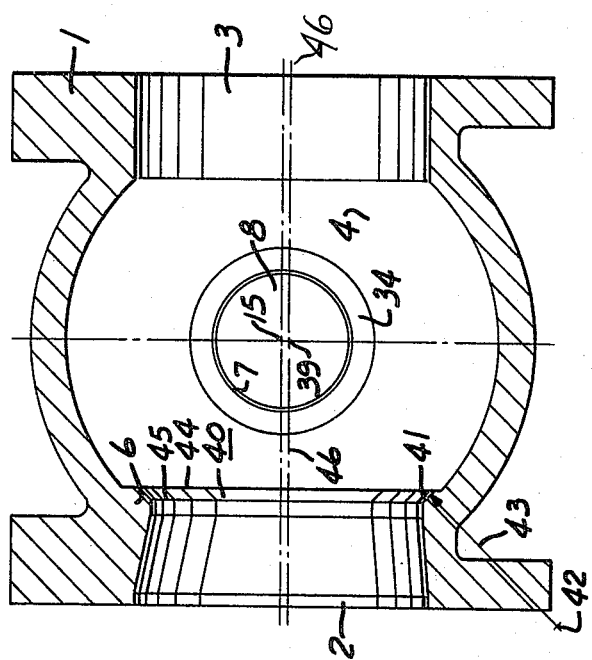

Nov. 8, 1966   R. P. KULISEK   3,284,045
PLUG VALVE
Filed April 13, 1965   6 Sheets-Sheet 4
Fig.6
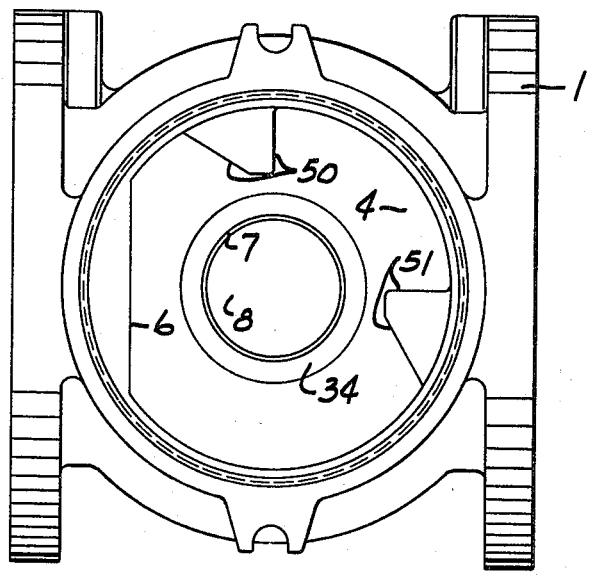
Fig.8
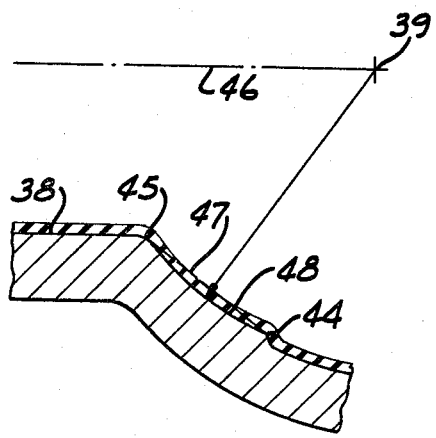
Fig.7
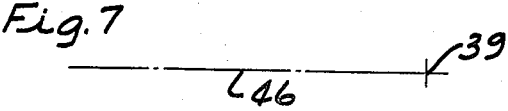
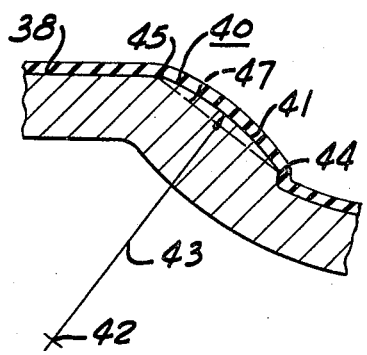
INVENTOR.
ROBERT P. KULISEK
BY William D. Carothers
HIS ATTORNEY Nov. 8, 1966 R. P. KULISEK 3,284,045
PLUG VALVE Filed April 13, 1965 6 Sheets-Sheet 6

INVENTOR.
ROBERT P. KULISEK
BY William D Carothers
HIS ATTORNEY

United States Patent Office 3,284,045
Patented Nov. 8, 1966

3,284,045
PLUG VALVE
Robert P. Kulisek, Aliquippa, Pa.
(% Homestead Valve Mfg. Co., Coraopolis, Pa.)
Filed Apr. 13, 1965, Ser. No. 449,928
2 Claims. (Cl. 251—315)

This invention relates generally to plug valves and more particularly to a plug valve having a partial spherical plug that closes on a circular seat without wiping the seat.

This invention is a continuation in part of application Serial No. 244,699, filed December 14, 1962, and now abandoned.

Partial plug valves of the art are generally cylindrical and when approaching the valve seat the plug must wipe the seating surface before fully closing. Some cylindrical valves have their face curvilinear transversely and are eccentric to the stem to which they are rigidly connected to have rotary seating and unseating movement in the valve chamber. Other partial plug type valves have their partial plugs, whether flat, cork, or ball type, movable relative to their crank-like stems and seat on circular concave seats. Such relative movement between the stem and the partial plug member gives rise to many and frequent failures. This is particularly true where the partial plug is merely bolted by a pin or bolt passing through a slot in the crank type stem. Again the plug that has play or movement on the crank type stem is subject to wear and if the valve handles any fluid that is the least bit abrasive it quickly wears.

The principal object of this invention is the provision of a partial spherical plug that is integrally solid with the stem and is offset to close against a complementary offset concave circular seat without wiping across the same.

Another object is the provision of a concave valve seat in a transverse wall of the valve chamber which seat is arcuate in cross section. The arcuate cross section may be concave and substantially complementary to the spherical surface of the spherical valve or it may be frusto conical. The preferable arcuate cross sectional form is that of a convex shape. Either of these forms may be provided with a convex curve that functions as the seat to be sealed.

Another object is the provision of a plug valve that is offset relative to the valve stem to provide a spherical valve plug for seating against a circular valve seat that is concave and lies within a flat transverse wall but has an arcuate cross section.

Another object is the provision of a plug valve member having a spherical plug member fixed relative to the valve stem with the cooperative seating surfaces on the plug valve and the valve body which are offset from the rotary axis of the plug valve stem having one of these seating surfaces coated and the other dry because there is no wiping of the cooperative surfaces on these members and no lubrication is required.

Another object is the provision of an elastomer coated spherical plug surface rigid relative to its valve stem and having its polar axis offset relative to the valve stem rotary axis to permit the spherical plug surface to seat on an offset circular concave bare metal valve seat in a transverse wall in the valve chamber of the valve body to close the valve port.

Another object is the provision of an elastomer coated valve body including a concave valve seat in a transverse valve chamber wall for cooperation with a bare metal spherical plug surface rigid relative to its valve stem and having its polar axis offset relative to the valve stem rotary axis but aligned with its cooperative valve seat when closed.

Other objects and advantages appear hereinafter in the following description and claims.

The accompanying drawings show for the purpose of exemplification without limiting this invention or the claims thereto certain practical embodiments illustrating the principles of this invention wherein:

FIG. 4 is a view in horizontal section taken on the line 4—4 of FIG. 3.

FIG. 5 is a view in vertical section taken along the line 5—5 of FIG. 3.

FIG. 6 is a top plan view of the valve body shown in FIG. 3.

FIG. 7 is an enlarged section detailed view of the circular concave valve seat the cross section of which is convex shown in FIG. 4.

FIG. 8 is an enlarged sectional detailed view of the circular concave valve seat, the cross section of which is concave.

FIG. 13 is a perspective view with parts broken away illustrating the concave valve seat in the transverse wall as shown in FIGS. 1 to 5.

Figure 1:
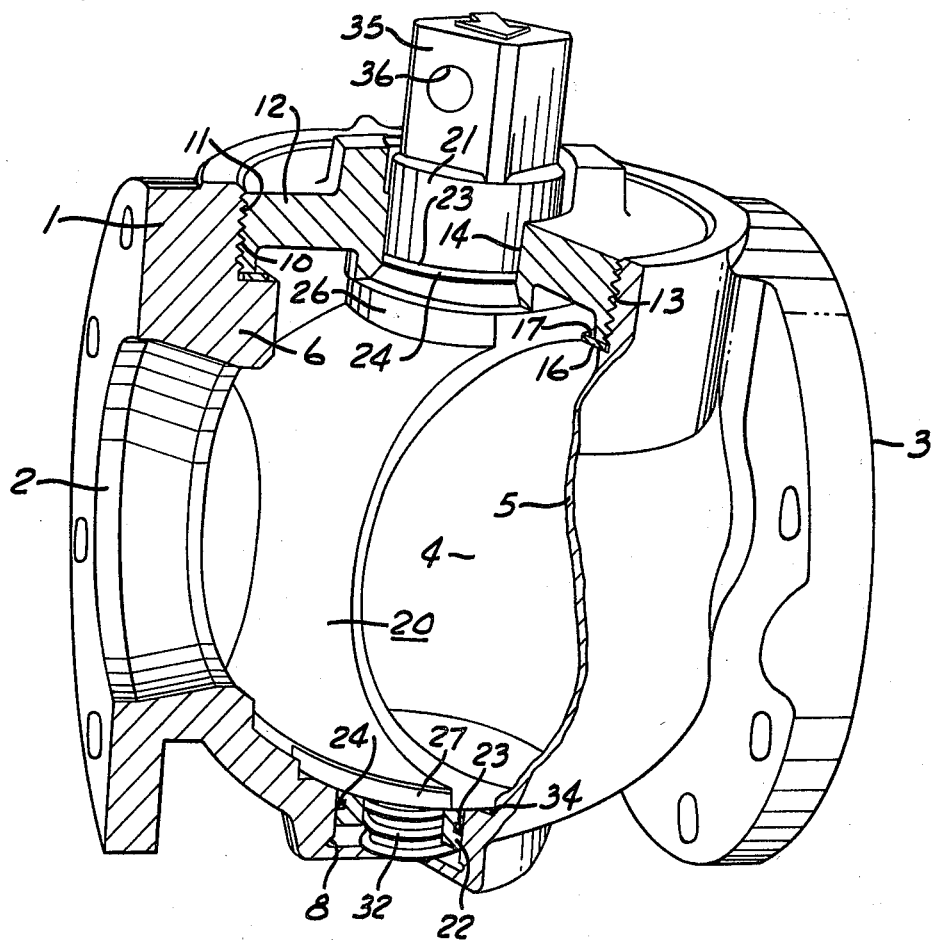
FIG. 1 is a perspective view of the plug valve in closed position comprising this invention with a part of the valve body broken away.
Figure 2:
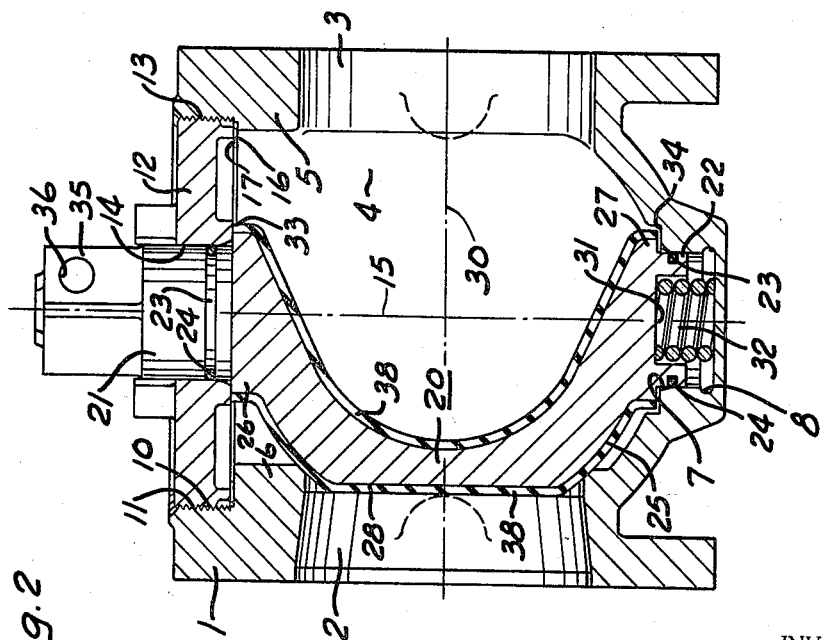
FIG. 2 is a view in vertical section of the plug valve in its closed position.

Referring to FIGS. 1 and 2 of the drawings the plug valve is provided with the valve body 1 having at its outer ends the ports 2 and 3 which are aligned on the outside of the valve body 1 and are connected to the valve chamber 4. The valve port 3 is in the wall 5 defining the valve chamber 4 and is concentric to an axis passing through the rotary vertical stem axis of the valve. The controlled port 2 is in the transverse wall 6 on the opposite side of the valve chamber 4 of the valve body 1. The bottom of the valve chamber 4 is provided with a plug valve stem support 7 which terminates in an enlarged closed bottom 8. The transverse wall 6 has a flat surface 9 that completely surrounds the port 2 as shown in FIGS. 1 to 5 and 13. The surface 9 is a flat smooth surface and may be wider or smaller depending upon the actual size of the port and valve seat recessed in the transverse wall 6 of the surface 9 on the cast body 1 as it is more economical to use the same exterior valve body dimension for different sizes of outlet ports. Thus a smaller port leaves a wider surface 9. This transverse surface 9 redirects the flow to the outlet port which being smaller creates an increase in velocity of the fluid across the surface 9 to wash and maintain the surface and valve seat recessed in the outlet port clean which is an important object for valves handling solids carried by the liquids such as in sewage disposal plants and in paper mills.

The top of the valve body 1 is provided with the enlarged cylindrical opening 10 the sides of which may be threaded as indicated at 11 for receiving the cap member 12 that is externally threaded as indicated at 13. The cap 12 has a central valve stem support 14 which is preferably the same size as the valve stem support 7 and both of these cylindrical bearing surfaces are axially aligned on the vertical central axis 15. The cap 12 is seated on the shoulder 16 and a sealing gasket member 17 is provided for the seat 16 and is held in place by the cap 12.

The valve plug 20 has upper and lower valve stem sections 21 and 22 which are respectively journaled in the valve stem supports 14 and 7 respectively. Each valve stem 21 and 22 is provided with an annular groove 23 for receiving the O-sealed ring 24 for the purpose of sealing the chamber 4 beyond these sealed points.

The valve plug 20 is a sector of a sphere, the spherical surface being indicated at 25 and the sector extending from the upper and lower plug ends 26 and 27 which are larger in diameter than the valve stem supports 7 and 14 and overlie the same. The frusto spherical sector 25 terminates in the transverse valve surface 28 which is normal to the polar axis 30 of the frusto spherical sector 25. Insofar as this plug 20 is concerned it could, of course, extend to the great diameter of its sphere and it would not interfere with the operation of the valve. However, it is desirable to maintain the cross section of the plug of substantially uniform thickness around its sector from the upper to the lower valve stem members 21 and 22 since it represents only approximately one-sixth of a full hollow sphere which makes it U-shaped.

The lower valve stem 22 has a cylindrical chamber 31 which is concentric with the valve stem axis 15 and houses therein the helical spring 32 which maintains the shoulder 26 at the top of the plug in engagement with the annular seat 33 on the underside of the cap 12 and provides clearance between the lower plug end 27 and the shoulder 34 at the bottom of the valve chamber 4.

The upper valve stem member 21 terminates in a squared wrench section 35 and is also provided with an opening 36 for receiving a rod or wrench to operate the valve.

As shown in FIGS. 1 and 2 the plug 20 has the whole of its surface within the chamber 4 covered with the elastomer 38 which is resilient and provides a simple positive seating material as well as resisting corrosion and wear thereby providing a low first cost and low upkeep dry seat member whether it be placed on the plug or whether it lines the interior of the valve chamber including the ports and the valve seat. In other words, it is preferable to have either the interior of the valve body or the exterior of the plug covered with a resilient elastomer such as a plastic or a highly resistant and long-lived elastic elastomer. Having one of the members, whether it be the valve plug or the interior of the valve body, coated and the other member bare or exposed metal, insures the proper seating of the valve and insures the provision of a low cost structure providing a dry valve seat that requires no lubrication and which will resist corrosion and always provide a drop-tight seal.

Figure 9:
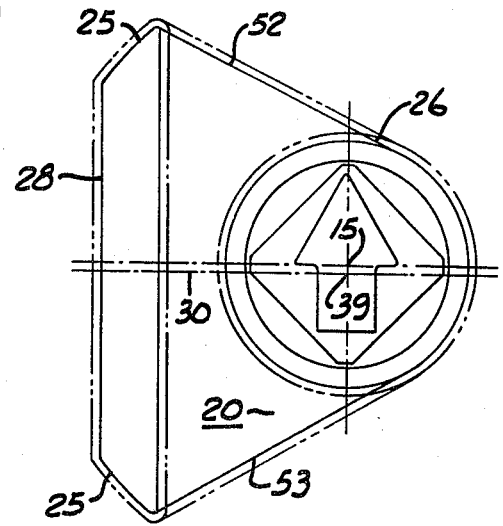
FIG. 9 is a top plan view of the plug valve shown in FIG. 2.

As shown in FIG. 9 the polar axis 30 of the spherical surface 25 is normal to the surface 28 and passes through a vertical construction axis 39 which is offset from the valve stem axis 15. This offset in sizes of three-inch and six-inch valves may be as much as one-eighth of an inch or it may be greater on extremely large valves.

Figure 3:
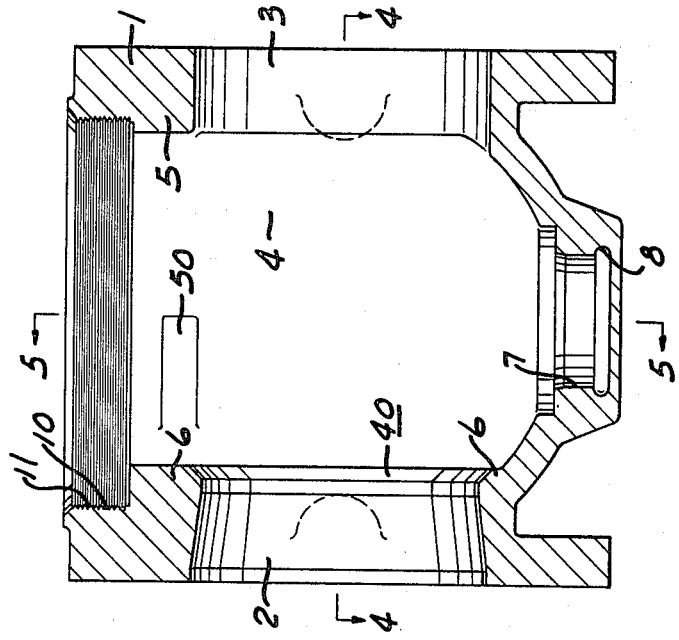
FIG. 3 is a view in vertical section of the valve body.

Referring specifically to FIGS. 3 to 6 showing the valve body, it will be noted that the transverse wall 6 which represents the inner transverse surface 9 of the valve chamber 4 that surrounds the port 2 as shown in FIG. 13 and is provided with a seat 40 which defines and is a part of the outlet port. This valve seat 40 is concave as illustrated in FIGS. 3 and 4 and is circular and is recessed in the transverse surface 9 of the transverse wall 6. This concave seat may be frusto conical or it may be provided with a convex cross sectional curvature as illustrated at 41 in FIG. 7 wherein the convex radius of the seat 40 may be as much as three and one-half inches from the center 42, the radius line being indicated at 43. Such a radius would be provided with a valve wherein the port 2 as shown in FIG. 4 is approximately six inches in diameter.

As shown in FIGS. 4, 5 and 7 the seat 40 lies between the transverse planes that would pass through the inner and outer edges 44 and 45 respectively and would be normal to the central axis 46 as illustrated in FIG. 4 which axis intersects the vertical construction axis 39 and is congruent to the axis 30 when the valve is closed. The inner edge 44 is in the transverse wall surface 9 and thus defines the chamber outlet but the outlet valve seat 40 lies beyond this inner edge 44. The axis 46 is offset from the vertical rotary axis 15 representing the rotary axis of the valve stem. The valve seat 40 is concave whether the cross section be frusto conical as indicated by the dotted lines or 47, convex as indicated at 41 or concave as indicated at 48 in FIG. 8 which latter concave surface would be spherical and complementary to the frusto-spherical sector 25 of the plug 20. As shown in FIG. 8 the solid line 48 indicates the interior of the valve seat to be covered by an elastomer. The corresponding plug to this valve would, of course, not be covered with an elastomer as indicated in FIG. 9 but would be bare, under which conditions the axis 46 becomes the polar axis of the surface 48 and passes through the vertical construction axis 39 as shown in FIG. 8.

As shown in FIGS. 3, 5 and 6 the valve body is provided with the internal stops 50 and 51. These stops prevent the edges 52 and 53 respectively of the valve 20 from passing any further than that which is required to seat the spherical plug valve surface 25, which is in effect a zone that is defined as a portion of the surface of a sphere included between two parallel planes, this zone seats on the circular concave seat 40. Under very close tolerances metal to metal contact can be made between the spherical surface 25 and the seat 40 at the proper selected offset. However, it is preferable to employ an elastomer coating on one of the members so as to avoid close tolerances and permit the use of one of the cooperating seat surfaces; namely, the seating surface 25 or the circular concave seat 40 as a machine member whereas the other cooperating surface may be a casing covered with elastomer. With very good casings one need not even machine one of the cooperating surfaces but rely solely upon the selected tolerance and offset together with the resiliency of the elastomer thereby reducing the cost to manufacture the valve.

As shown in the drawings the valve bodies are provided with flanges and the upper holes in the valve body would be drilled and tapped. However, the lower holes would be through holes for receiving bolts and nuts which permits the valve to be readily inserted and withdrawn from fixed flanges in service.

Figure 10:
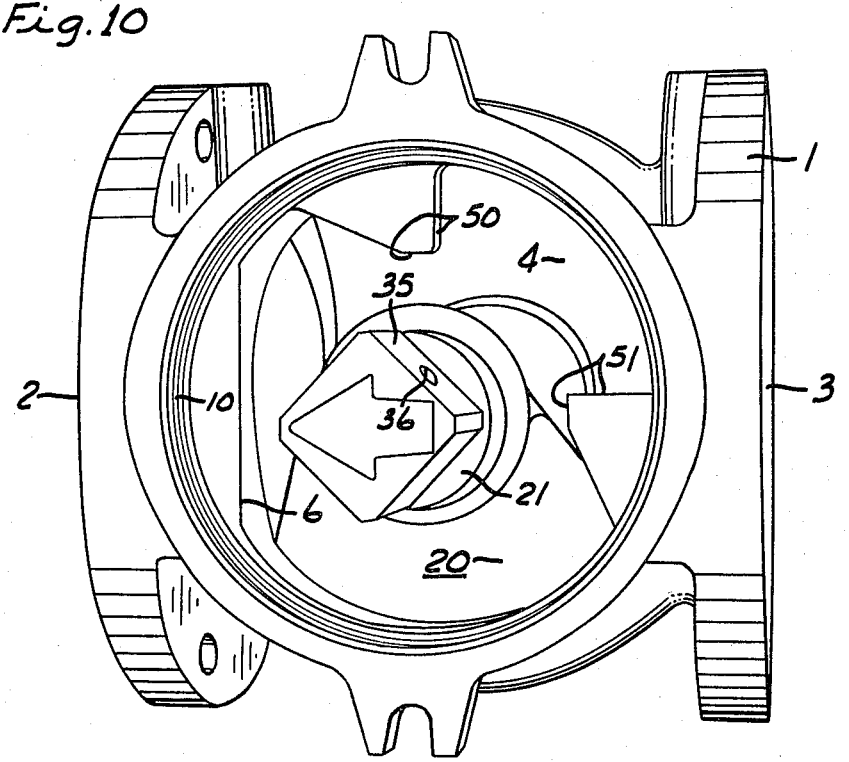
FIGS. 10, 11 and 12 are diagrammatic views illustrating the plug valve comprising this invention illustrating the valve full open, half open, and closed respectively.
Figure 11:
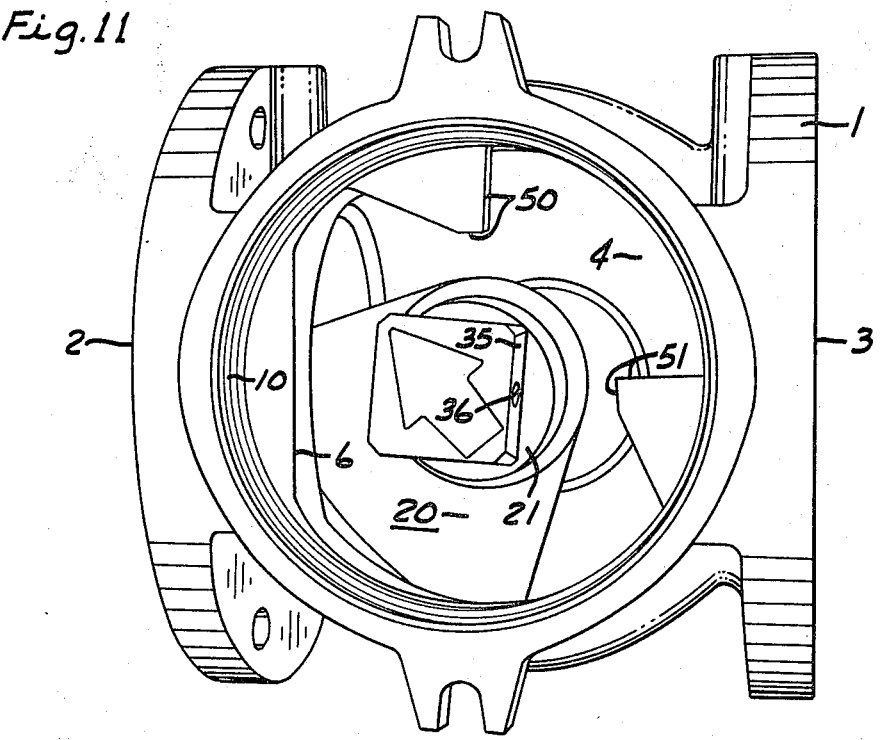
Figure 12:
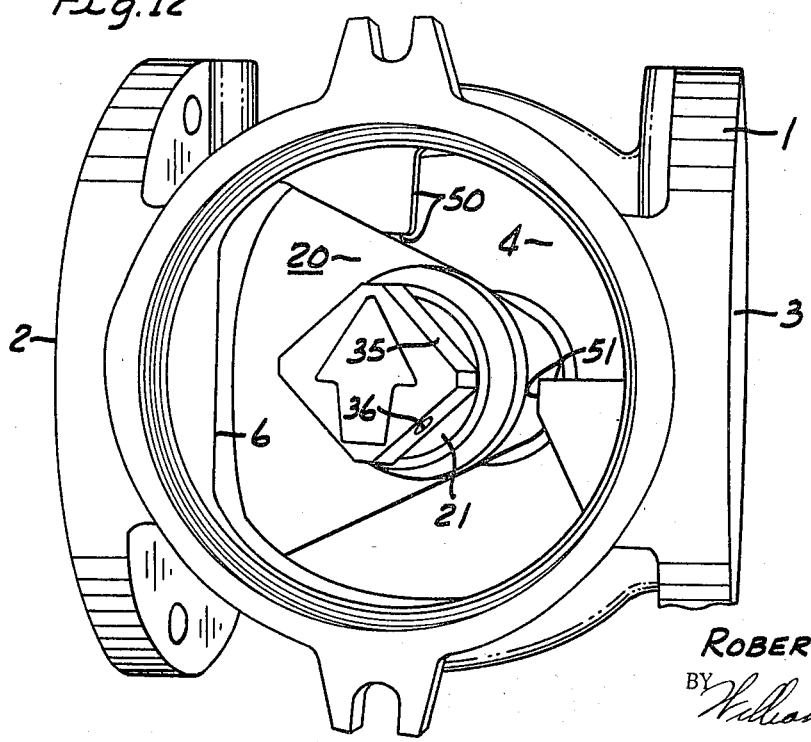

The diagrammatic views of FIGS. 10, 11 and 12 illustrate the relative positions of the valve when full open, half open, and closed respectively. The plug 20, being approximately one-sixth of a spherical ball, allows the full valve chamber to be full open between the ports 2 and 3. When the valve is positioned in the half open position as illustrated in FIG. 11, fluid passes on opposite sides of the plug so as to equalize the pressure thereon but, of course, the principal flow is on that side which is disposed in the opening of the port 2. However, as the valve plug proceeds to its closed position it merely directly fits into the frusto conical seat 40 and the spherical surface 25 does not rub or otherwise engage this seat 40 until and when the valve is stopped in its fully closed position.

I claim:

1. A plug valve assembly including a valve body with a chamber having an inlet and an outlet port and a flat transverse wall surface across one end and a circular unfinished valve seat recessed therein and connecting said valve chamber with one of said ports, a spherical plug sector covered with an elastomer and having a valve seating spherical zone surface the polar axis of which is aligned with the axis of said one port which axis is offset relative to the rotary axis of said spherical plug sector, a cap closing said spherical plug sector in said valve chamber, an operating stem on said spherical plug sector having one end journaled in the bottom of said valve chamber and the other end journaled in said cap, characterized in that said circular unfinished valve seat has within its axial limits a convex cross section longitudinally of the axis of said seat to receive said spherical valve zone seating surface in seating engagement.

2. The plug valve assembly of claim 1 characterized in that said circular unfinished valve seat is covered with an elastomer.

References Cited by the Examiner

UNITED STATES PATENTS

| | | |
|---|---|---|
| 123,031 | 1/1872 | Maclaren. |
| 1,028,134 | 6/1912 | Raymaker 251—301 |
| 2,803,426 | 8/1957 | De Zurik 251—301 |
| 3,191,906 | 6/1965 | Zeigler 251—304 |

FOREIGN PATENTS

| | | |
|---|---|---|
| 200,460 | 11/1958 | Austria. |
| 1,142,546 | 4/1957 | France. |
| 468,991 | 7/1937 | Great Britain. |
| 256,919 | 11/1946 | Switzerland. |

M. CARY NELSON, *Primary Examiner.*

A. JAFFE, E. FEIN, *Assistant Examiners.*